(12) United States Patent
Ueno

(10) Patent No.: US 11,724,894 B2
(45) Date of Patent: Aug. 15, 2023

(54) LINEAR CONVEYOR SYSTEM, A CONTROL METHOD FOR A LINEAR CONVEYOR SYSTEM, A CONTROL PROGRAM FOR A LINEAR CONVEYOR SYSTEM AND A RECORDING MEDIUM

(71) Applicant: YAMAHA HATSUDOKI KABUSHIKI KAISHA, Iwata (JP)

(72) Inventor: Kenji Ueno, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 52 days.

(21) Appl. No.: 17/601,495

(22) PCT Filed: Apr. 16, 2019

(86) PCT No.: PCT/JP2019/016318
§ 371 (c)(1),
(2) Date: Oct. 5, 2021

(87) PCT Pub. No.: WO2020/213057
PCT Pub. Date: Oct. 22, 2020

(65) Prior Publication Data
US 2022/0194719 A1     Jun. 23, 2022

(51) Int. Cl.
*B65G 54/02*     (2006.01)
*B65G 43/00*     (2006.01)

(52) U.S. Cl.
CPC ............ *B65G 54/02* (2013.01); *B65G 43/00* (2013.01); *B65G 2203/0283* (2013.01)

(58) Field of Classification Search
CPC ..... B65G 54/02; B65G 43/00; B65G 47/5145
(Continued)

(56) References Cited

U.S. PATENT DOCUMENTS 5,090,555 A * 2/1992 Kura ..................... B65G 35/06
                                                                                                           198/465.1
5,147,029 A * 9/1992 Wadell ................... B65G 23/22
                                                                                                           198/716

(Continued)

FOREIGN PATENT DOCUMENTS

CN        103144907 A     6/2013
JP         H05-193731 A    8/1993
(Continued)

OTHER PUBLICATIONS

International Search Report issued in PCT/JP2019/016318; dated Jul. 23, 2019.

(Continued)

*Primary Examiner* — James R Bidwell
(74) *Attorney, Agent, or Firm* — Studebaker & Brackett PC

(57) ABSTRACT

A judgment process of judging whether or not the movable linear module is located in the facing range is performed before the slider transfer operation of moving the slider from the fixed linear module to the movable linear module located in the facing range is performed. As a result, unless the movable linear module is judged to be located in the facing range, the slider transfer operation is performed after a preparation operation of moving the movable linear module into the facing range is performed. Therefore, the slider can be properly moved from the fixed linear module to the movable linear module.

10 Claims, 12 Drawing Sheets

(58) Field of Classification Search
USPC .......................................................... 198/805
See application file for complete search history.

(56) References Cited

U.S. PATENT DOCUMENTS

| | | | | |
|---|---|---|---|---|
| 2003/0057060 | A1* | 3/2003 | Richardson | B23Q 5/341 |
| | | | | 198/465.2 |
| 2012/0186948 | A1* | 7/2012 | Ishino | B65G 54/025 |
| | | | | 198/805 |
| 2018/0076069 | A1* | 3/2018 | Burkhard | B65B 65/003 |
| 2019/0393813 | A1* | 12/2019 | Huang | H02P 7/025 |
| 2021/0067007 | A1* | 3/2021 | Okazaki | H02K 41/031 |

FOREIGN PATENT DOCUMENTS

| | | |
|---|---|---|
| JP | 5977145 B2 | 8/2016 |
| WO | 2018/055709 A1 | 3/2018 |
| WO | 2018/055755 A1 | 3/2018 |

OTHER PUBLICATIONS

Office Action mailed by China National Intellectual Property Administration dated Sep. 14, 2022, which corresponds to Chinese Patent Application No. 201980095429.4 and is related to U.S. Appl. No. 17/601,495.

* cited by examiner

LINEAR CONVEYOR SYSTEM, A CONTROL METHOD FOR A LINEAR CONVEYOR SYSTEM, A CONTROL PROGRAM FOR A LINEAR CONVEYOR SYSTEM AND A RECORDING MEDIUM

CROSS-REFERENCE TO RELATED APPLICATION

This application is a National Stage of International Patent Application No. PCT/JP2019/016318, filed Apr. 16, 2019, the entire contents of which is incorporated herein by reference.

BACKGROUND

Technical Field

This disclosure relates to a linear conveyor system with a mechanism for driving a slider by linear modules.

Background Art

JP5977145 describes a conveyance system which includes conveyance devices for conveying a slider in an X direction and transfer devices for conveying the slider received from the conveyance device in a Y direction and conveys a pallet supported on the slider by driving the slider. Such a conveyance system can cyclically drive the slider supporting the pallet by arranging two conveyance devices spaced apart in the Y direction and arranging two transfer devices on both sides in the X direction of these conveyance devices.

SUMMARY

The transfer devices, which receives the slider from a fixed linear module (conveyance device) for driving the slider in the X direction and moves this slider in the Y direction, can be configured by movable linear modules movable in the Y direction. In such a configuration, an operation of moving the slider between the fixed linear module and the movable linear module is appropriately performed while the movable linear module is located in a facing range facing toward the fixed linear module from the X direction. However, there have been cases where the slider cannot properly move between the fixed linear module and the movable linear module since it is attempted to perform this operation without the movable linear module being located in the facing range.

This disclosure thus provides a technique enabling a slider to properly move between a fixed linear module and a movable linear module.

A linear conveyor system according to the disclosure, comprises a fixed linear module extending in a first direction and driving a slider in the first direction; and a module driving mechanism that includes a movable linear module movable along a movable region extending in a second direction intersecting the first direction. The movable region includes a facing range facing toward the fixed linear module from the first direction and a range other than the facing range, the movable linear module drives the slider in the first direction, and the module driving mechanism drives the movable linear module in the second direction in the movable region. The linear conveyor system further includes a controller that controls drive of the slider and the movable linear module. The slider is engageable with and disengageable from the fixed linear module from an end in the first direction and the fixed linear module drives the slider engaged with the fixed linear module in the first direction. The slider is engageable with and disengageable from the movable linear module from an end in the first direction and the movable linear module drives the slider engaged with the movable linear module in the first direction. A slider transfer operation of moving the slider between the fixed linear module and the movable linear module located in the facing range is performed, and the controller performs the slider transfer operation after performing a preparation operation of moving the movable linear module to the facing range if the movable linear module is judged not to be located in the facing range as a result of performing a judgment process of judging whether or not the movable linear module is located in the facing range before the slider transfer operation is performed.

The present disclosure also provides a control method for a linear conveyor system according to the disclosure, with the linear conveyor system including a fixed linear module extending in a first direction and driving a slider in the first direction, and a module driving mechanism that includes a movable linear module movable along a movable region extending in a second direction intersecting the first direction. The movable region includes a facing range facing toward the fixed linear module from the first direction and a range other than the facing range, the movable linear module drives the slider in the first direction, and the module driving mechanism drives the movable linear module in the second direction in the movable region. The method comprises performing a judgment process of judging whether or not the movable linear module is located in the facing range before a slider transfer operation of moving the slider between the fixed linear module and the movable linear module located in the facing range is performed; performing a preparation operation of moving the movable linear module into the facing range if the movable linear module is judged not to be located in the facing range in the judgment process; and performing the slider transfer operation after the preparation operation.

The present disclosure further provides a linear conveyor system control program for a linear conveyor system according to the disclosure, with the linear conveyor system including a fixed linear module extending in a first direction and driving a slider in the first direction, and a module driving mechanism that includes a movable linear module movable along a movable region extending in a second direction intersecting the first direction. The movable region includes a facing range facing toward the fixed linear module from the first direction and a range other than the facing range, the movable linear module drives the slider in the first direction, and the module driving mechanism drives the movable linear module in the second direction in the movable region. The linear conveyor system control program causes a computer to perform a judgment process of judging whether or not the movable linear module is located in the facing range before a slider transfer operation of moving the slider between the fixed linear module and the movable linear module located in the facing range is performed; perform a preparation operation of moving the movable linear module into the facing range if the movable linear module is judged not to be located in the facing range in the judgment process; and perform the slider transfer operation after the preparation operation.

Also, a recording medium according to the disclosure computer-readably records the linear conveyor system control program.

According to the disclosure thus configured (linear conveyor system, linear conveyor system control method, linear conveyor system control program and recording medium), the judgment process of judging whether or not the movable linear module is located in the facing range is performed before the slider transfer operation of moving the slider between the fixed linear module and the movable linear module located in the facing range is performed. As a result, if the movable linear module is judged not to be located in the facing range, the slider transfer operation is performed after the preparation operation of moving the movable linear module into the facing range is performed. Therefore, the slider can be properly moved between the fixed linear module and the movable linear module.

The linear conveyor system may be configured so that the slider is moved from the fixed linear module to the movable linear module located in the facing range in the slider transfer operation. In such a configuration, the judgment process of judging whether or not the movable linear module is located in the facing range is performed before the slider transfer operation of moving the slider from the fixed linear module to the movable linear module located in the facing range is performed. As a result, if the movable linear module is judged not to be located in the facing range, the slider transfer operation is performed after the preparation operation of moving the movable linear module into the facing range is performed. Therefore, the slider can be properly moved from the fixed linear module to the movable linear module.

The linear conveyor system may be configured so that the controller performs a standby operation of moving the slider from a stop position where the slider is stopped when the preparation operation is started to a standby position on the fixed linear module closer to the facing range than the stop position in the first direction in parallel with the preparation operation. In such a configuration, the slider is moved to the standby position in parallel with the preparation operation of moving the movable linear module to the facing range, and an efficient control can be executed, utilizing a period required for the preparation operation for the movement of the slider.

The linear conveyor system may be configured so that the controller performs the slider transfer operation by moving the slider located at the standby position on the fixed linear module to the movable linear module moved to the facing range by the preparation operation when the preparation operation is completed after the completion of the standby operation. In this way, the slider can be properly moved from the fixed linear module to the movable linear module. Particularly, since the slider is caused to wait at the standby position by the standby operation performed in parallel with the preparation operation, the slider transfer operation can be quickly completed only by moving the slider from the standby position to the movable linear module after the completion of the preparation operation.

The linear conveyor system may be configured so that the controller performs the slider transfer operation by starting to move the slider from a stop position on the fixed linear module where the slider is stopped when the preparation operation is started toward the facing range when the slider moving toward the facing range in the preparation operation passes through a predetermined position and moving the slider to the movable linear module moved to the facing range by the preparation operation. In such a configuration, the movement of the slider toward the facing range is started in parallel with the preparation operation of moving the movable linear module to the facing range, and an efficient control can be executed, utilizing a period required for the preparation operation for the movement of the slider.

The linear conveyor system may be configured so that the slider is moved from the movable linear module located in the facing range to the fixed linear module in the slider transfer operation. In such a configuration, the judgment process of judging whether or not the movable linear module is located in the facing range is performed before the slider transfer operation of moving the slider from the movable linear module located in the facing range to the fixed linear module is performed. As a result, if the movable linear module is judged not to be located in the facing range, the slider transfer operation is performed after the preparation operation of moving the movable linear module into the facing range is performed. Therefore, the slider can be properly moved from the movable linear module to the fixed linear module.

The linear conveyor system may be configured so that the controller performs a standby operation of moving the slider from a stop position where the slider is stopped when the preparation operation is started to a standby position on the movable linear module closer to the fixed module than the stop position in the first direction in parallel with the preparation operation. In such a configuration, the slider is moved to the standby position in parallel with the preparation operation of moving the movable linear module to the facing range, and an efficient control can be executed, utilizing a period required for the preparation operation for the movement of the slider.

The linear conveyor system may be configured so that the controller performs the slider transfer operation by moving the slider located at the standby position on the movable linear module moved to the facing range by the preparation operation to the fixed linear module when the preparation operation is completed after the completion of the standby operation. In this way, the slider can be properly moved from the movable linear module to the fixed linear module. Particularly, since the slider is caused to wait at the standby position by the standby operation performed in parallel with the preparation operation, the slider transfer operation can be quickly completed only by moving the slider from the standby position to the fixed linear module after the completion of the preparation operation.

According to the disclosure, the slider can be properly moved from the fixed linear module to the movable linear module.

DETAILED DESCRIPTION

Figure 1:
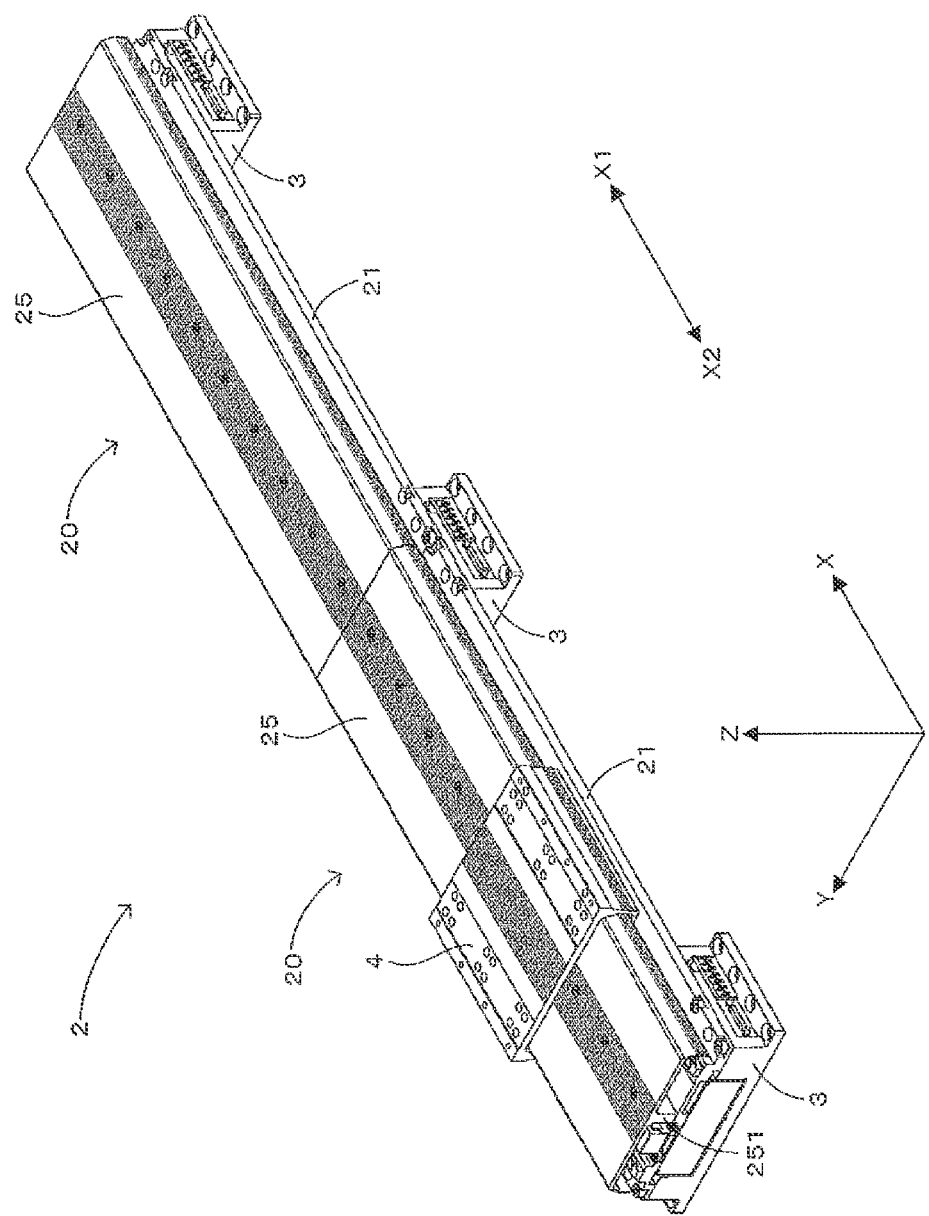
FIG. 1 is a perspective view showing an example of a linear module provided in a linear conveyor system according to the disclosure.
Figure 2:
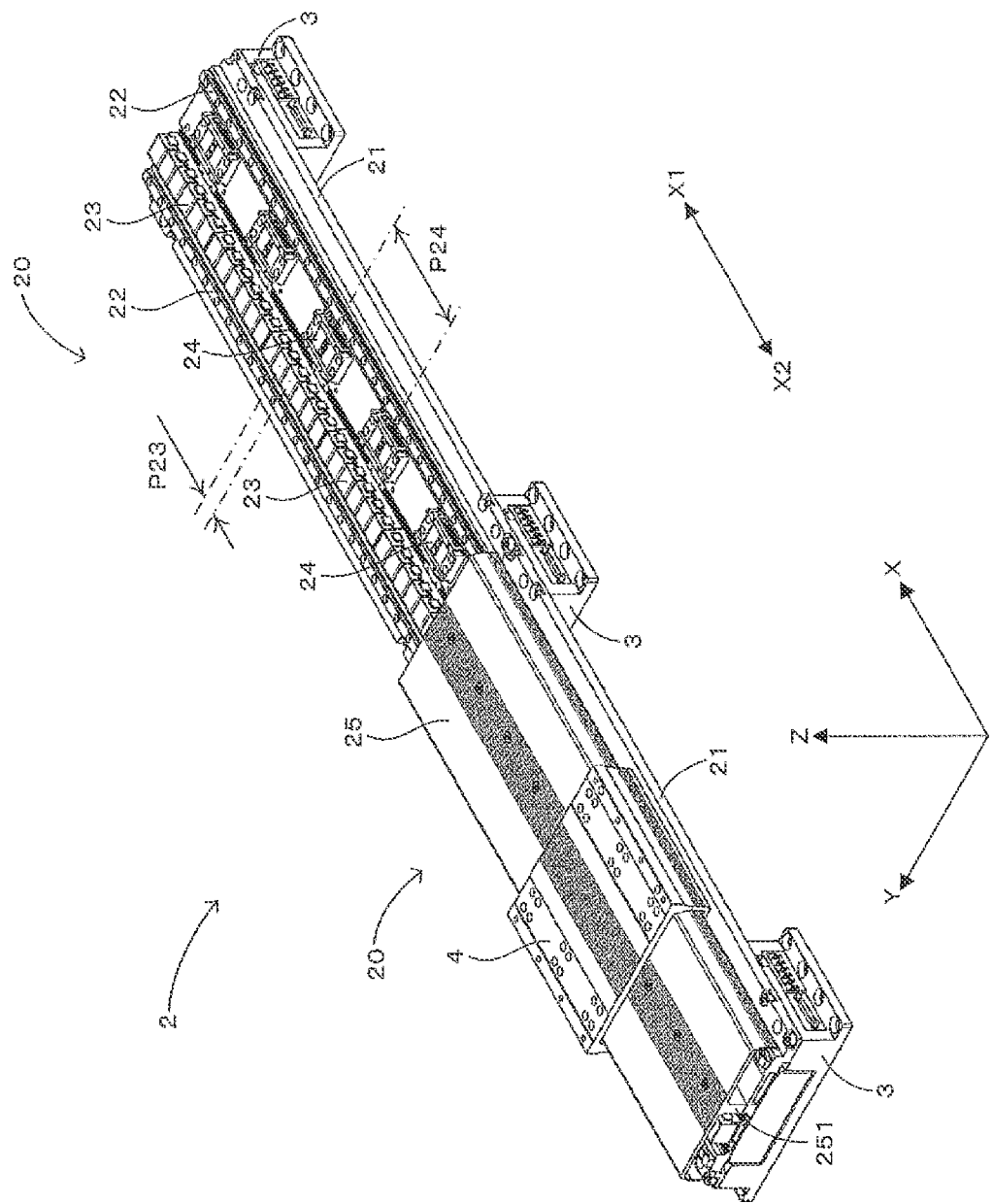
FIG. 2 is a perspective view showing the linear module of FIG. 1 with the inside of the linear module partially exposed.

FIG. 1 is a perspective view showing an example of a linear module provided in a linear conveyor system according to the disclosure, and FIG. 2 is a perspective view showing the linear module of FIG. 1 with the inside of the linear module partially exposed. In FIGS. 1 and 2, XYZ orthogonal coordinate axes including an X direction parallel to a horizontal direction, a Y direction parallel to the horizontal direction while being orthogonal to the X direction and a Z direction parallel to a vertical direction are shown. Further, an oblique right-upper side along the X direction in FIGS. 1 and 2 is written as an X1 side and an oblique left-lower side along the X direction in FIGS. 1 and 2 is written as an X2 side. Similar notations are also used as appropriate in the following drawings. This linear module has a basic configuration similar to, for example, that of a module of a linear conveyor device described in WO2018/055709A1. Here, the entire linear conveyor system is described after the linear module is described.

A linear module 2 extending in the X direction, base members 3 supporting the linear module 2 from below and a slider 4 engaged with the linear module 2 are shown in FIGS. 1 and 2. The linear module 2 is mounted on the upper ends of three base members 3 arranged at equal intervals in the X direction and drives the slider 4 in the X direction by a magnetic force. In this example, the linear module 2 is composed of two module units 20 arrayed in the X direction. However, the number of the module units 20 constituting the linear module 2 is not limited to two, and may be one, three or more.

The module unit 20 includes a base plate 21 extending in the X direction. The base plate 21 is a flat plate having a rectangular shape in a plan view from the Z direction. Two guide rails 22 parallel to the X direction are arranged on the upper surface of the base plate 21 while being spaced apart in the Y direction. Further, a plurality of linear motor stators 23 arranged in a row in the X direction at a predetermined arrangement pitch P23 and a plurality of magnetic sensors 24 arranged in a row in the X direction at a predetermined arrangement pitch P24 are mounted on the upper surface of the base plate 21. Here, the arrangement pitch P24 of the magnetic sensors 24 is longer than the arrangement pitch P23 of the linear motor stators 23. In the Y direction, the plurality of linear motor stators 23 are arranged between the two guide rails 22 and the plurality of magnetic sensors 24 are arranged between the linear motor stators 23 and one guide rail 22.

The linear motor stator 23 is an electromagnet including a coil and a core inserted in the coil. On the other hand, the slider 4 is provided with a mover including a permanent magnet and a back yoke for holding the permanent magnet. The linear motor stators 23 drive the slider 4 in the X direction by giving a magnetic thrust to the mover of the slider 4 by generating a magnetic flux corresponding to an applied current. Further, a magnetic scale indicating positions in the X direction is mounted on the slider 4, and the magnetic sensor 24 detects the position of the slider 4 in the X direction by reading the magnetic scale. The slider 4 is driven in the X direction by feedback-controlling the current applied to the linear motor stators 23 based on the position of the slider 4 detected by the magnetic sensors 24 as described later.

Further, the module unit 20 includes a cover member 25 having a rectangular shape in a plan view which covers these guide rails 22, linear motor stators 23 and magnetic sensors 24 from above. The cover member 25 includes a support leg 251 projecting downward in a center in the Y direction, and the support leg 251 is mounted on the upper surface of the base plate 21. Clearances are formed between the cover member 25 and the base plate 21 on both ends in the Y direction, and both end parts of the slider 4 inserted between the cover member 25 and the base plate 21 through these clearances are respectively engaged with the two guide rails 22.

The linear module 2 includes a plurality of (two) module units 20 arrayed in the X direction. Such a linear module 2 has a rectangular shape in a plan view. The module unit 20 on the X1 side, out of the two module units 20 of the linear module 2, is laid between the base member 3 on the X1 side end and a central base member 3, out of the three base members 3, and the module unit 20 on the X2 side is laid between the base member 3 on the X2 side end and the central base member 3, out of the three base members 3.

The slider 4 can be engaged with the guide rails 22 of the linear module 2 by approaching form an end of the linear module 2 toward a central side of the linear module 2 in the X direction. The slider 4 engaged with the guide rails 22 in this way is driven in the X direction by the linear module 2. Further, the slider 4 can be separated from the guide rails 22 of the linear module 2 by exiting to outside from an end of the linear module 2 in the X direction.

Figure 3:
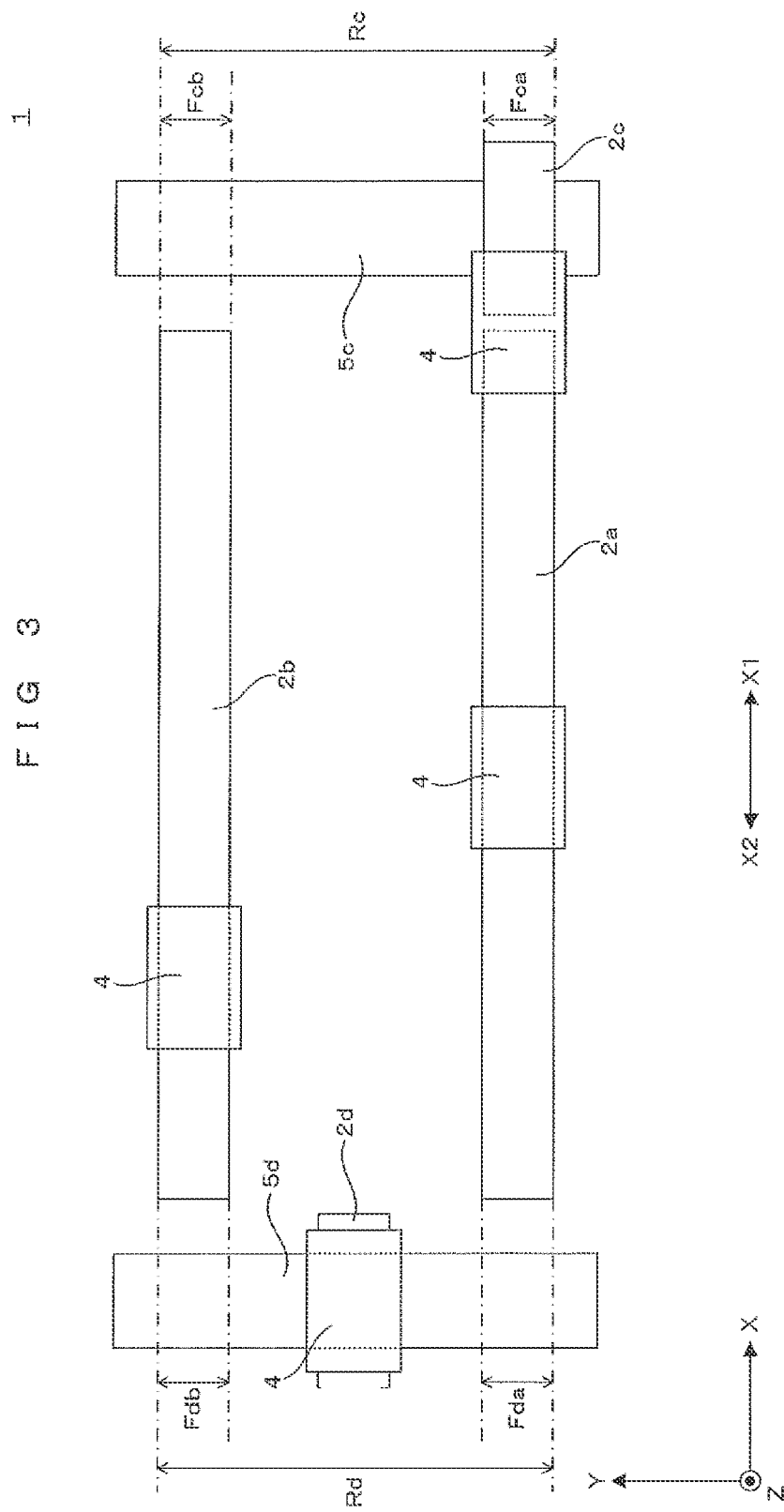
FIG. 3 is a diagram schematically showing an example of the linear conveyor system according to the disclosure.

FIG. 3 is a diagram schematically showing an example of the linear conveyor system according to the disclosure. The linear conveyor system 1 includes four linear modules 2. Note that mutually different signs 2a, 2b, 2c and 2d are given to the four linear modules 2 in FIG. 3.

The linear modules 2a, 2b are fixed linear modules fixed to an installation surface of the linear conveyor system 1, and the linear modules 2c, 2d are movable linear modules movable in the Y direction with respect to the installation surface. The fixed linear modules 2a, 2b and the movable linear modules 2c, 2d have different lengths in the X direction while having the same width in the Y direction. However, these have the common basic configuration shown in FIGS. 1 and 2 except the lengths in the X direction.

Two fixed linear modules 2a, 2b are arranged in parallel to the X direction while being spaced apart in the Y direction. The fixed linear modules 2a, 2b arranged in parallel to the X direction in this way have the same length in the X direction. On other hand, the movable linear modules 2c, 2d have the same length shorter than the fixed linear modules 2a, 2b in the X direction.

Such a linear conveyor system 1 includes two actuators 5c, 5d which drives the movable linear modules 2c, 2d in the Y direction. The actuator 5c is arranged in parallel to the Y direction on the X1 sides of the fixed linear modules 2a, 2b in the X direction. The actuator 5d is arranged in parallel to the Y direction on the X2 sides of the fixed linear modules 2a, 2b in the X direction. In this way, the two actuators 5c, 5d are arranged to sandwich two fixed linear modules 2a, 2b in the X direction.

The actuator 5c is, for example, a single-axis robot including a ball screw parallel to the Y direction, and the movable linear module 2c is attached to a nut of the ball screw of the actuator 5c. This actuator 5c drives the movable linear module 2c in the Y direction along a movable region Rc. Here, the movable region Rc is a region extending in the Y direction and including a facing range Fca facing toward an end on the X1 side of the fixed linear module 2a from the X1 side in the X direction and a facing range Fcb facing toward an end on the X1 side of the fixed linear module 2b from the X1 side in the X direction. The facing range Fca is equivalent to a presence range (including a tolerance of the movable linear module 2c) of the movable linear module 2c arranged in a row with the fixed linear module 2a in the X direction, the facing range Fcb is equivalent to a presence range (including the tolerance of the fixed linear module 2c) of the movable linear module 2c arranged in a row with the fixed linear module 2b in the X direction.

The actuator 5d is, for example, a single-axis robot including a ball screw parallel to the Y direction, and the movable linear module 2d is attached to a nut of the ball screw of the actuator 5d. This actuator 5d drives the movable linear module 2d in the Y direction along a movable region Rd. Here, the movable region Rd is a region extending in the Y direction and including a facing range Fda facing toward an end on the X2 side of the fixed linear module 2a from the X2 side in the X direction and a facing range Fdb facing toward an end on the X2 side of the fixed linear module 2b from the X2 side in the X direction. The facing range Fda is equivalent to a presence range (including a tolerance of the movable linear module 2d) of the movable linear module 2d arranged in a row with the fixed linear module 2a in the X direction and the facing range Fdb is equivalent to a presence range (including the tolerance of the fixed linear module 2b) of the movable linear module 2d arranged in a row with the fixed linear module 2b in the X direction.

In such a linear conveyor system 1, the slider 4 can be circularly driven. For example, the fixed linear module 2a drives the slider 4 engaged therewith toward the X1 side in the X direction with the movable linear module 2c located in the facing range Fca, whereby the slider 4 can be moved from the fixed linear module 2a to the movable linear module 2c. Then, the movable linear module 2c located in the facing range Fcb drives the slider 4 engaged therewith toward the X2 side in the X direction after the actuator 5c moves the movable linear module 2c from the facing range Fca to the facing range Fcb, whereby the slider 4 can be moved from the movable linear module 2c to the fixed linear module 2b.

Further, the fixed linear module 2b drives the slider 4 engaged therewith toward the X2 side in the X direction with the movable linear module 2d located in the facing range Fdb, whereby the slider 4 can be moved from the fixed linear module 2b to the movable linear module 2d. Then, the movable linear module 2d located in the facing range Fda drives the slider 4 engaged therewith toward the X1 side in the X direction after the actuator 5d moves the movable linear module 2d from the facing range Fdb to the facing range Fda, whereby the slider 4 can be moved from the movable linear module 2d to the fixed linear module 2a.

In this way, the slider 4 can be circularly driven counter-clockwise. Further, the slider 4 can be circularly driven clockwise by performing an operation opposite to the above one. Further, the circular drive is merely an example of a drive mode of the slider 4 executable by the linear conveyor system 1 and the slider 4 can be driven in various other modes.

Figure 4:
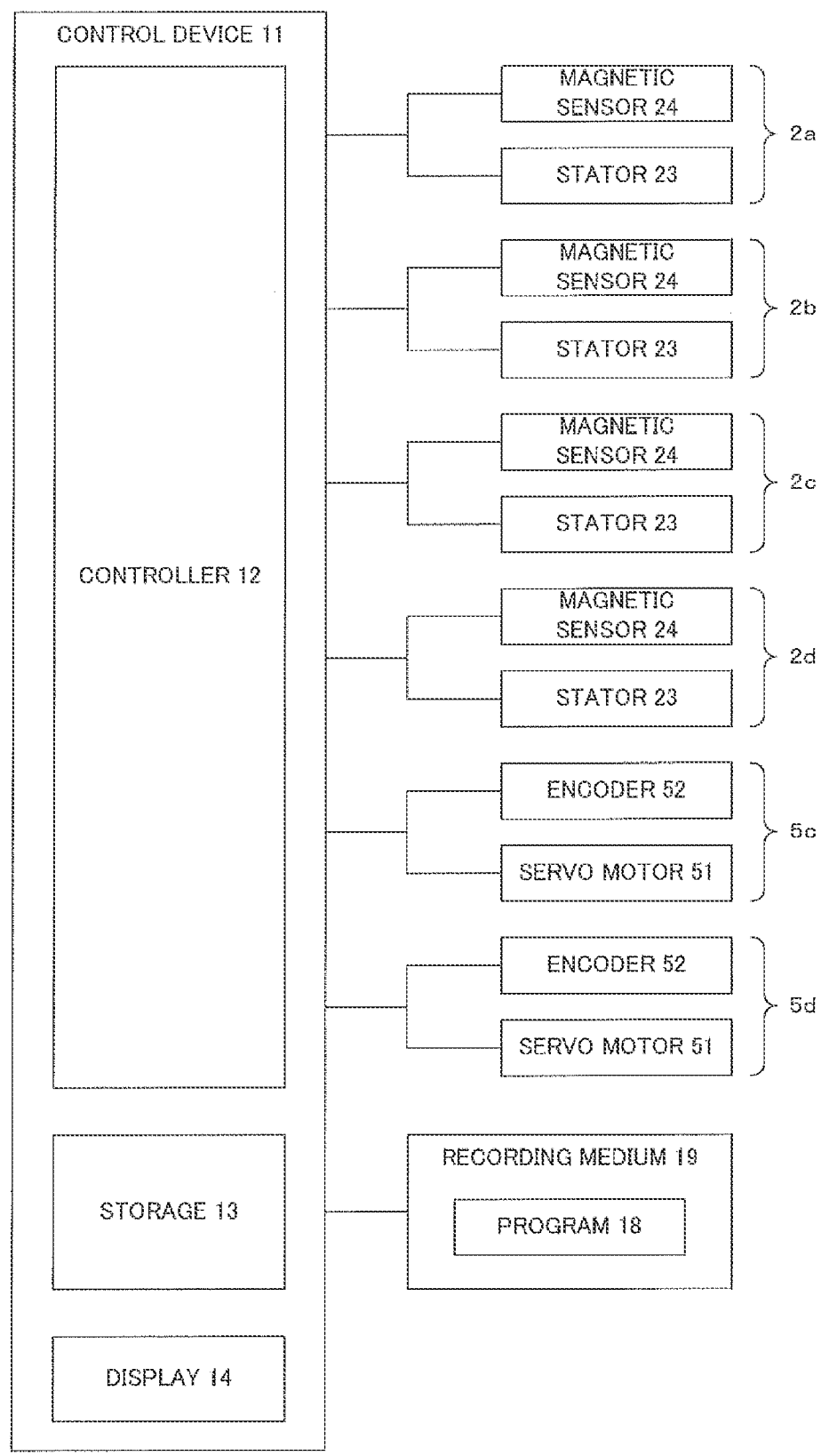
FIG. 4 is a block diagram showing an example of an electrical configuration of the linear conveyor system of FIG. 3.

FIG. 4 is a block diagram showing an example of an electrical configuration of the linear conveyor system of FIG. 3. The linear conveyor system 1 includes a control device 11 which controls the position of each slider 4 while monitoring the entire system. This control device 11 is a computer such as a personal computer.

The control device 11 includes a controller 12, a storage 13 and a display 14. The controller 12 is, for example, a processor configured by a CPU (Central Processing Unit) and performs computation in the control device 11. The storage 13 is, for example, configured by an HDD (Hard Disk Drive) and stores data and programs used in computation in the control device 2. Particularly, the storage 13 stores a program 18 for causing the controller 12 of the control device 11 to execute a control to be described later. This program 18 may be installed in the storage 13 by being provided in a state readable by the control device 11 by means of a recording medium 19 such as a USB (Universal Serial Bus) memory or may be installed in the storage 13 by being downloaded from an Internet server. The display 14 is, for example, a touch panel display and functions as a UI (User Interface) for not only showing displays to a user, but also receiving input operations from the user.

The controller 12 of such a control device 11 causes each of the fixed linear modules 2a to 2d to drive the slider 4 by feedback-controlling the linear motor stators 23 based on the position of the slider 4 detected by the magnetic sensors 24. Further, each of the actuators 5c, 5d includes a servo motor 51 which rotates the ball screw and an encoder 52 which detects the rotational position of the servo motor 51. The controller 12 causes the respective actuators 5c, 5d to drive the movable linear modules 2c, 2d by feedback-controlling the servo motors 51 based on the rotational positions detected by the encoders 52.

In such a linear conveyor system 1, a slider transfer operation of moving the slider 4 from the fixed linear module 2a, 2b to the movable linear module 2c, 2d is performed as appropriate. For example, in the case of moving the slider 4 from the fixed linear module 2b to the movable linear module 2c, the slider transfer operation is performed by moving the slider 4 on the fixed linear module 2b in the X direction toward the movable linear module 2c located in the facing range Fcb facing toward the fixed linear module 2b from the X direction. At this time, unless the movable linear module 2c as a movement destination is located in the facing range Fcb facing toward the fixed linear module 2b as a movement origin, the slider 4 cannot be moved from the fixed linear module 2b to the movable linear module 2c. Accordingly, the control device 11 realizes a reliable movement of the slider 4 by executing a slider transfer control described next.

Figure 5:
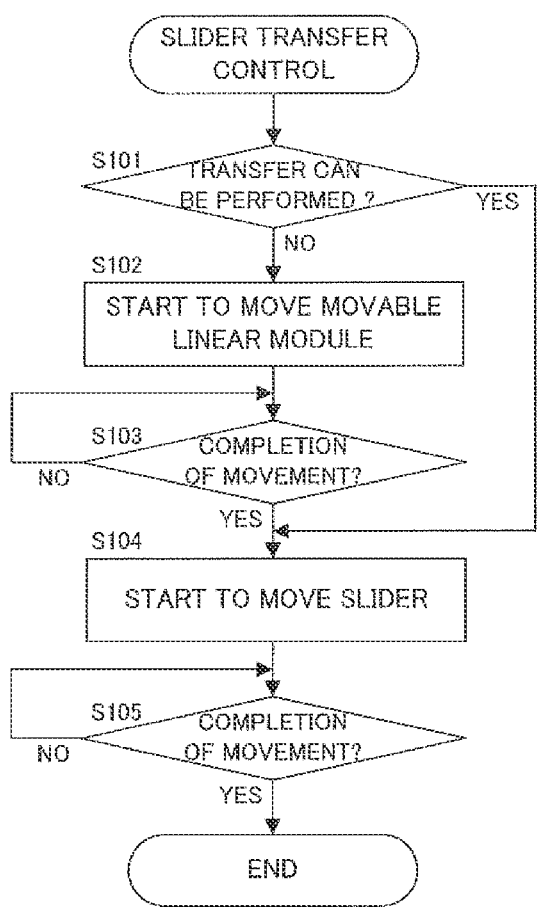
FIG. 5 is a flow chart showing a first example of the slider transfer control executed by the linear conveyor system shown in FIG. 3.
Figure 6:
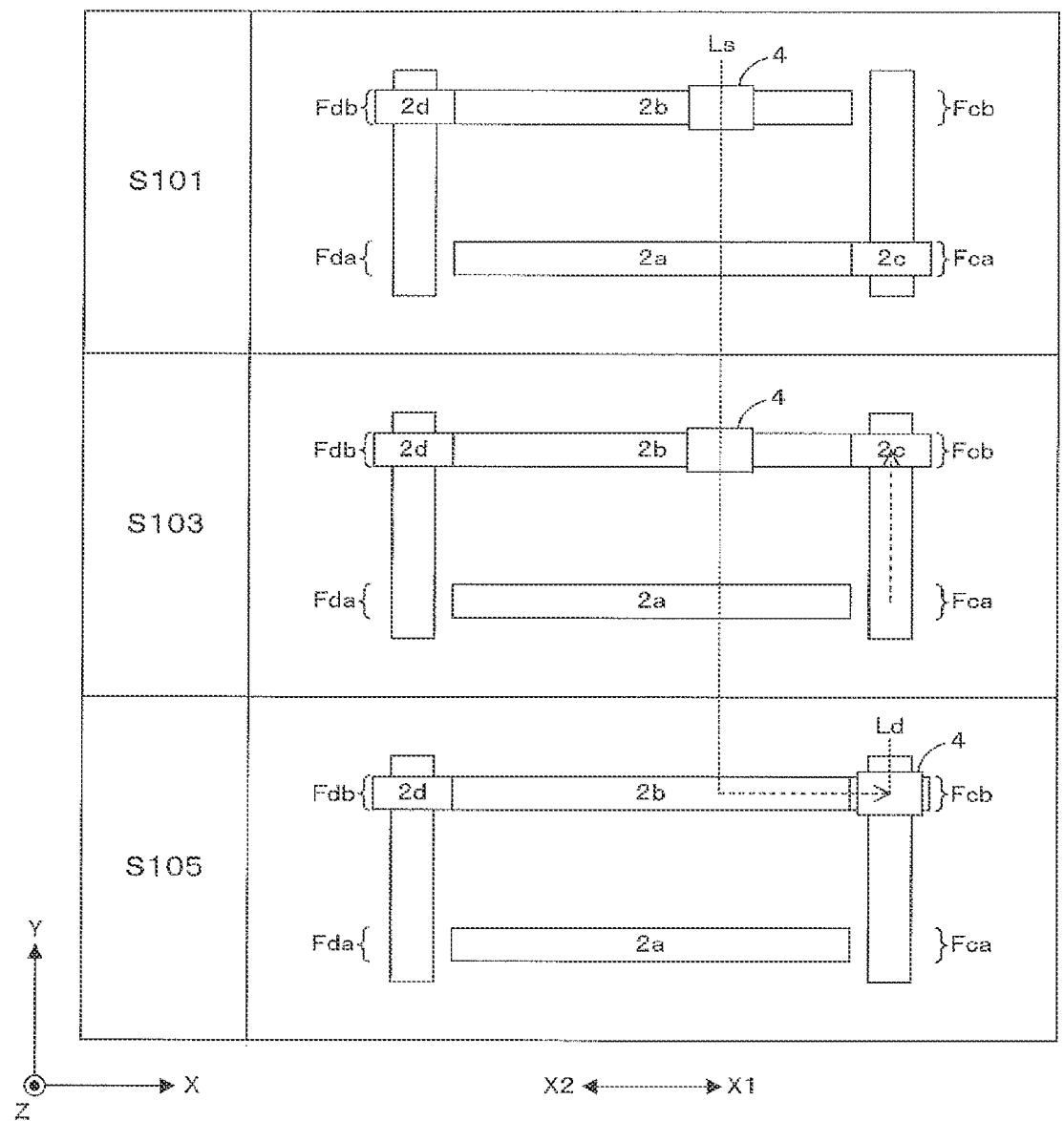
FIG. 6 is a chart schematically showing an operation performed by the slider transfer control of FIG. 5.

FIG. 5 is a flow chart showing a first example of the slider transfer control executed by the linear conveyor system shown in FIG. 3, and FIG. 6 is a chart schematically showing an operation performed by the slider transfer control of FIG. 5. This flow chart is specified by the program 18 and performed by the controller 12 controlling each component based on the program 18. Further, this flow chart can be commonly performed for slider transfer operations by the following combinations:

Fixed linear module 2a and movable linear module 2c,
Fixed linear module 2a and movable linear module 2d,
Fixed linear module 2b and movable linear module 2c,
and Fixed linear module 2*b* and movable linear module 2*d*. The slider transfer operation of moving the slider 4 from the fixed linear module 2*b* to the movable linear module 2*c* is described as an example here. Note that it is assumed that the slider 4 and the movable linear modules 2*c*, 2*d* are stopped when this flow chart is started. These points are also common to second and third examples of the slider transfer control described later.

In Step S101, it is judged whether or not the slider 4 can be transferred from the fixed linear module 2*b* to the movable linear module 2*c*. Specifically, if the movable linear module 2*c* as the movement destination of the slider 4 is located in the facing range Fcb facing toward the fixed linear module 2*b* as the movement origin of the slider 4, it is judged that the transfer can be performed ("YES" in Step S101). If the movable linear module 2*c* is not located in the facing range Fcb facing toward the fixed linear module 2*b*, it is judged that the transfer cannot be performed ("NO" in Step S101). Note that if even a part of the movable linear module 2*c* is located outside the facing range Fcb, it is judged that the movable linear module 2*c* is not located in the facing range Fcb.

If it is judged in Step S101 that the transfer can be performed (YES), advance is made to Step S104. On the other hand, if the movable linear module 2*c* is not located in the facing range Fcb and deviates from the facing range Fcb in the Y direction as illustrated in a field of "S101" of FIG. 6, it is judged in Step S101 that the transfer cannot be performed (NO). In this case, a movement of the movable linear module 2*c* to the facing range Fcb is started and the movable linear module 2*c* moves toward the facing range Fcb in the Y direction (Step S102). When the movable linear module 2*c* reaches the facing range Fcb as illustrated in a field of "S103" of FIG. 6 and the completion of the movement of the movable linear module 2*c* to the facing range Fcb is confirmed ("YES" in Step S103), advance is made to Step S4.

In Step S104, a movement of the slider 4 from a movement start position Ls on the fixed linear module 2*b* toward a movement target position Ld on the movable linear module 2*c* in the facing range Fcb is started, and the slider 4 moves from the movement start position Ls toward the movement target position Ld in the X direction. If the slider 4 reaches the movement target position Ld on the movable linear module 2*c* as illustrated in a field of "S105" of FIG. 6 and the completion of the movement of the slider 4 from the movement start position Ls to the movement target position Ld is confirmed ("YES" in Step S105), the control of FIG. 5 is finished. In this way, the slider transfer operation (Steps S104, S105) of moving the slider 4 from the movement start position Ls on the fixed linear module 2*b* to the movement target position Ld on the movable linear module 2*c* is performed.

As just described, in the first example of the slider transfer control, a judgment process (Step S101) of judging whether or not the movable linear module 2*c* is located in the facing range Fcb is performed before the slider transfer operation (Steps S104, S105) of moving the slider 4 from the fixed linear module 2*b* to the movable linear module 2*c* located in the facing range Fcb is performed. As a result, unless the movable linear module 2*c* is judged to be located in the facing range Fcb, the slider transfer operation (Steps S104, S105) is performed after a preparation operation (Steps S102, S103) of moving the movable linear module 2*c* into the facing range Fcb is performed. Therefore, the slider 4 can be properly moved from the fixed linear module 2*b* to the movable linear module 2*c*.

Figure 7:
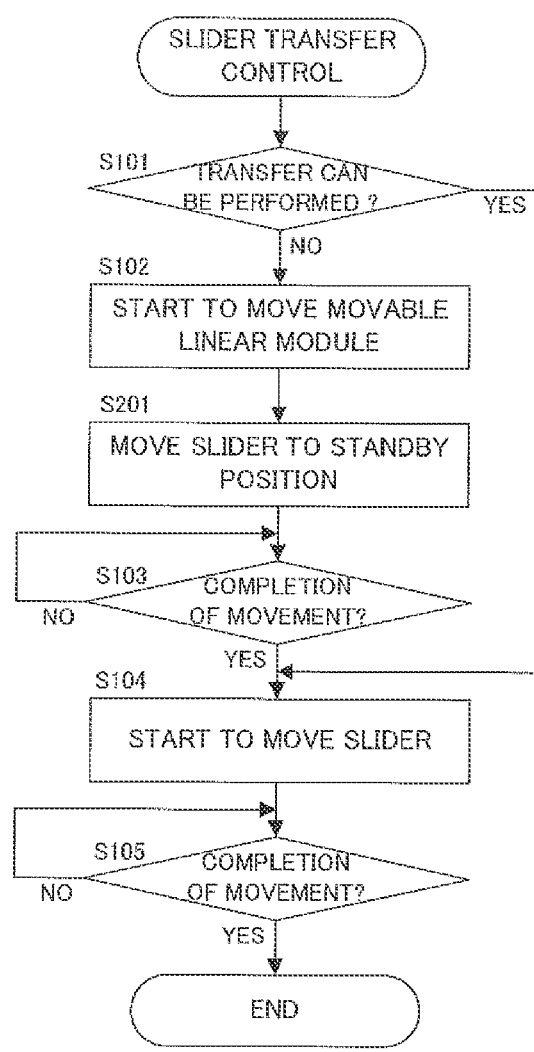
FIG. 7 is a flow chart showing the second example of the slider transfer control executed by the linear conveyor system shown in FIG. 3.
Figure 8:
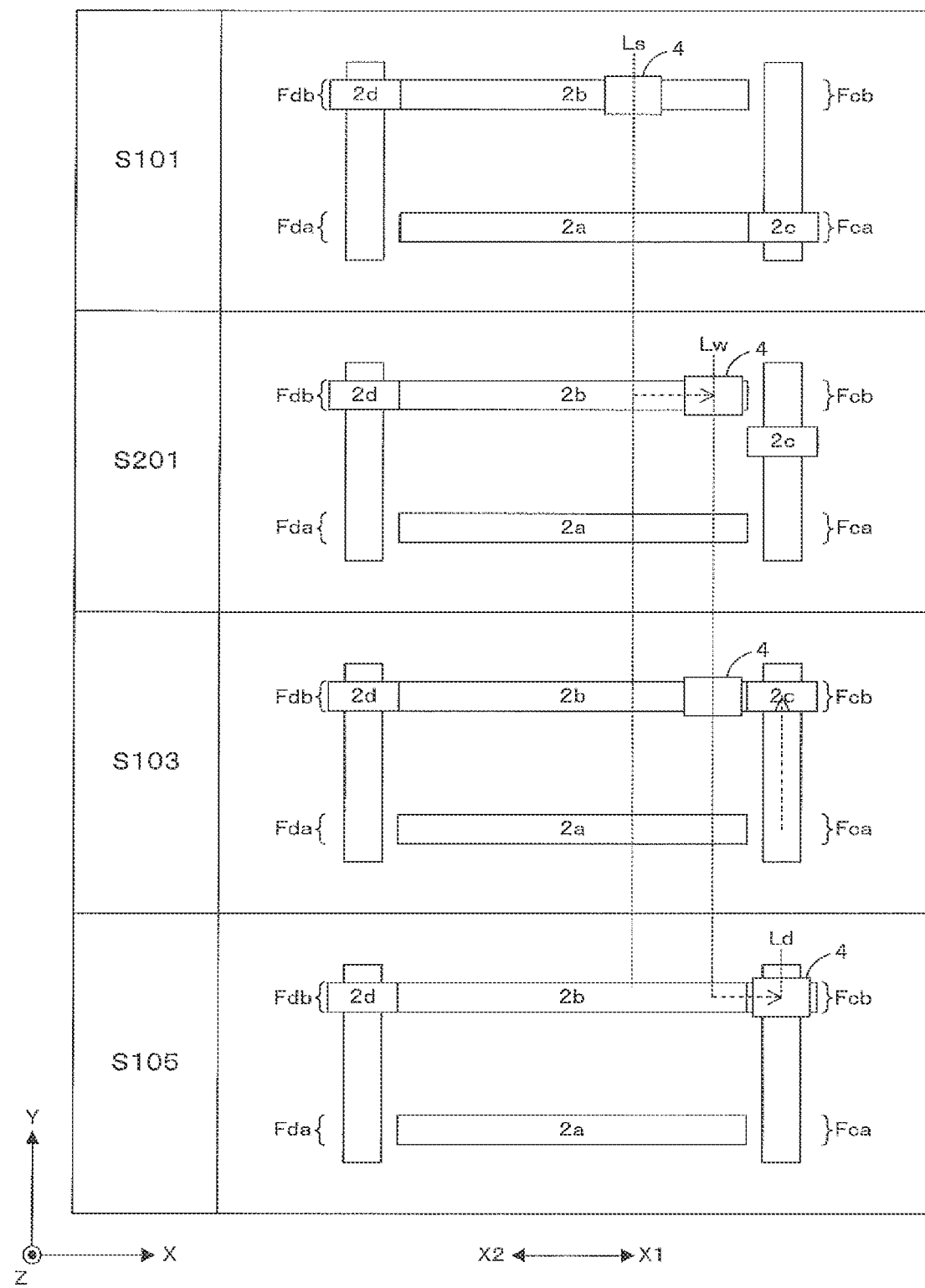
FIG. 8 is a chart schematically showing an operation performed by the slider transfer control of FIG. 7.

FIG. 7 is a flow chart showing the second example of the slider transfer control executed by the linear conveyor system shown in FIG. 3, and FIG. 8 is a chart schematically showing an operation performed by the slider transfer control of FIG. 7. This description is centered on differences from the first example of the slider transfer control, common parts are denoted by corresponding reference signs and description is omitted as appropriate. However, it goes without saying that similar effects are achieved by having the common parts.

In this second example, a standby position Lw is set on an end of the fixed linear module 2*b* on the side of the facing range Fcb. This standby position Lw is set on the fixed linear module 2*b* to be located between the movement start position Ls of the slider 4 on the fixed linear module 2*b* and the facing range Fcb facing toward the fixed linear module 2*b*. That is, the standby position Lw is provided on the end of the fixed linear module 2*b* adjacent to the facing range Fcb.

As illustrated in a field of "S101" of FIG. 8, the movable linear module 2*c* deviates from the facing range Fcb and the slider 4 moves toward the standby position Lw (Step S201) as the movable linear module 2*c* starts to move toward the facing range Fcb. In this way, the slider 4 is moved from the movement start position Ls to the standby position Lw (Step S201) in parallel with the movement of the movable linear module 2*c* (Steps S102, S103).

As illustrated in a field of "S201" of FIG. 8, the slider 4 stops at the standby position Lw when reaching this standby position Lw. In this way, the slider 4 waits at the standby position Lw until the movable linear module 2*c* reaches the facing range Fcb. Then, the slider 4 starts to move from the standby position Lw toward the movement target position Ld (Step S104) if the movement of the movable linear module 2*c* to the facing range Fcb is completed ("YES" in Step S103) as illustrated in a field of "S103" of FIG. 8. Then, if the slider 4 reaches the movement target position Ld on the movable linear module 2*c* as illustrated in a field of "S105" of FIG. 8 and the completion of the movement of the slider 4 from the standby position Lw to the movement target position Ld is confirmed ("YES" in Step S105), the control of FIG. 7 is finished. In this way, a slider transfer operation (Steps S104, S105) of moving the slider 4 from the standby position Lw on the fixed linear module 2*b* to the movement target position Ld on the movable linear module 2*c* is performed.

As just described, in the second example of the slider transfer control, the control device 11 performs a standby operation (Step S201) of moving the slider 4 from the movement start position Ls (stop position) where the slider 4 is stopped when the preparation operation (Steps S102, S103) of moving the movable linear module 2*c* to the facing range Fcb is started to the standby position Lw on the fixed linear module 2*b* in parallel with the preparation operation (Steps S102, S103), the standby position Lw being closer to the facing range Fcb than the movement start position Ls in the X direction. In such a configuration, the slider 4 is moved to the standby position Lw in parallel with the preparation operation (Steps S102, S103) of moving the movable linear module 2*c* to the facing range Fcb, and an efficient control can be executed, utilizing a period required to move the movable linear module 2*c* to the facing range Fcb for the movement of the slider 4.

Further, the control device 11 performs the slider transfer operation (Steps S104, S105) by moving the slider 4 located at the standby position Lw to the movable linear module 2*c* in the facing range Fcb when the preparation operation (Steps S102, S103) of moving the movable linear module 2*c* to the facing range Fcb is completed after the completion of the standby operation (Step S201) of moving the slider 4 to the standby position Lw. As just described, the slider 4 can be properly moved from the fixed linear module 2b to the movable linear module 2c in this way. Particularly, the slider 4 is caused to wait at the standby position Lw by the movement of the slider 4 to the standby position Lw performed in parallel with the movement of the movable linear module 2c to the facing range Fcb. Thus, the slider transfer operation can be quickly completed only by moving the slider 4 from the standby position Lw to the movable linear module 2c after the movement of the movable linear module 2c to the facing range Fcb is completed.

Figure 9:
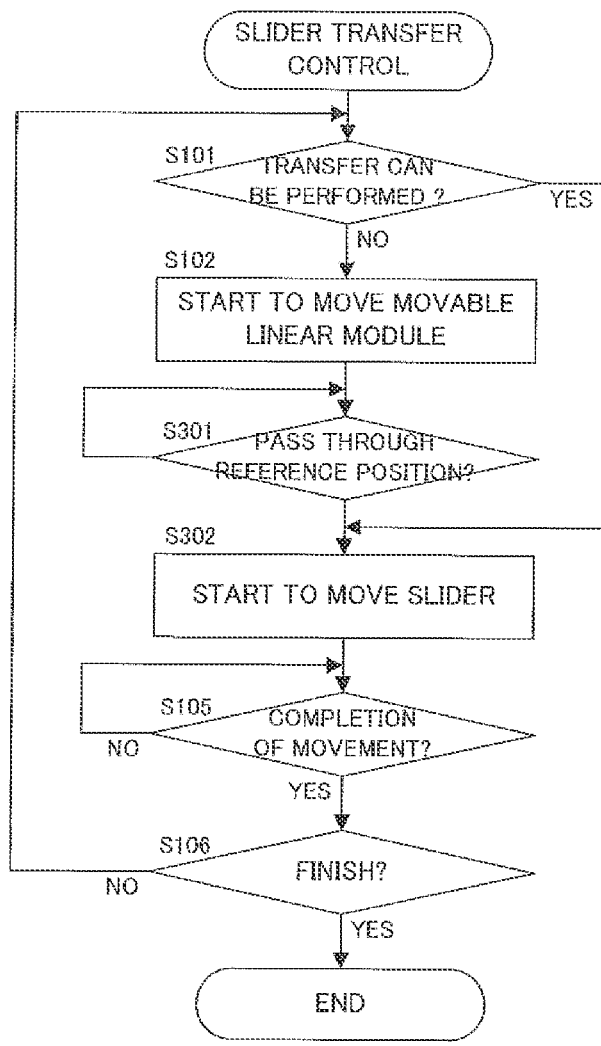
FIG. 9 is a flow chart showing the third example of the slider transfer control executed by the linear conveyor system shown in FIG. 3.
Figure 10:
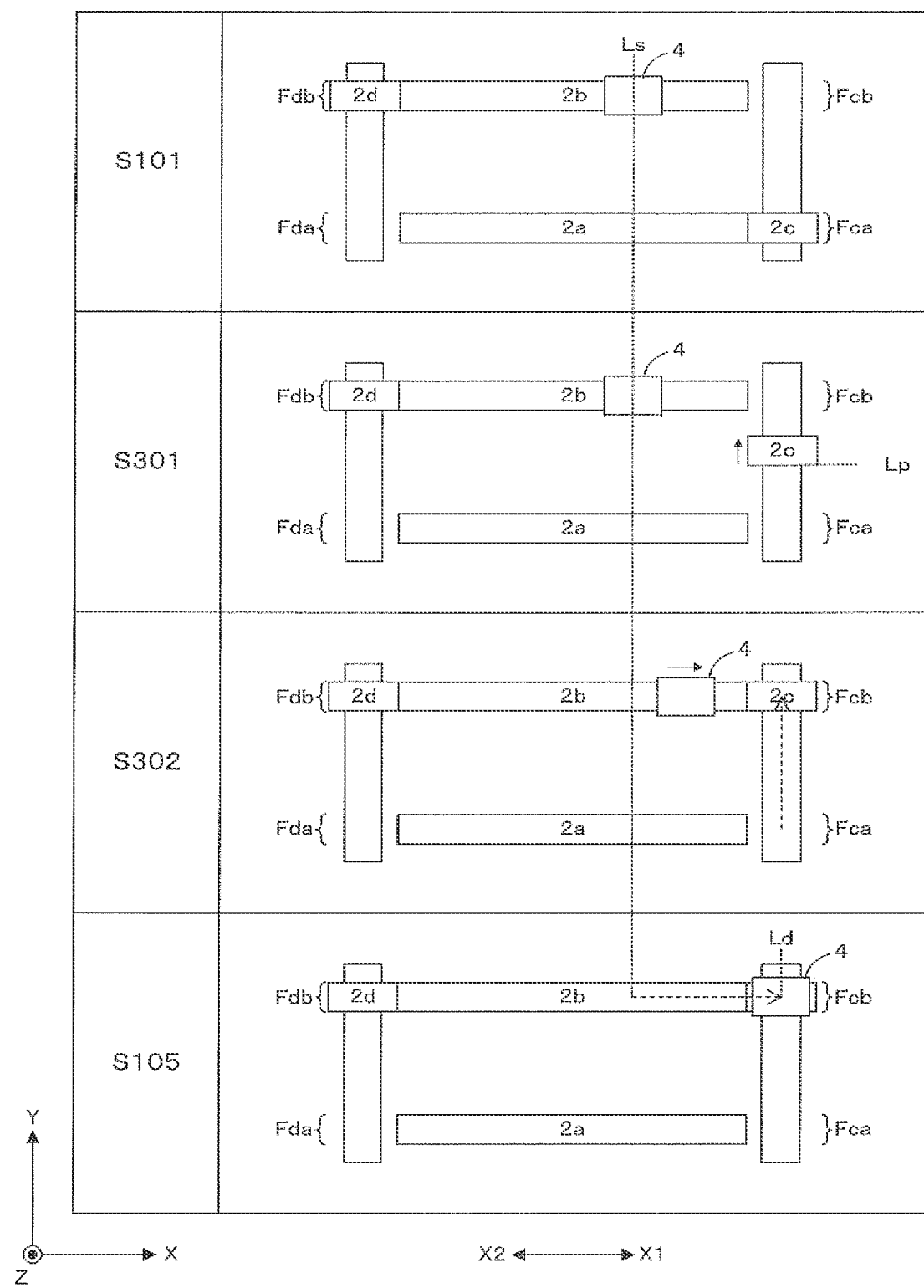
FIG. 10 is a chart schematically showing an operation performed by the slider transfer control of FIG. 9.

FIG. 9 is a flow chart showing the third example of the slider transfer control executed by the linear conveyor system shown in FIG. 3, and FIG. 10 is a chart schematically showing an operation performed by the slider transfer control of FIG. 9. This description is centered on differences from the first example of the slider transfer control, common parts are denoted by corresponding reference signs and description is omitted as appropriate. However, similar effects are achieved by having the common parts.

In this third example, a reference position Lp at a predetermined distance from the facing range Fcb in the Y direction is provided. This reference position Lp is set in a movable region Rc of the movable linear module 2c. As described later, if the movable linear module 2c passes through the reference position Lp, the slider 4 starts to move from the movement start position Ls. At this time, the reference position Lp is set based on moving speeds of the movable linear module 2c and the slider 4 and a distance between the movement start position Ls and the movement target position Ld so that the slider 4 reaches the movement target position Ld after the movable linear module 2c reaches and stops at the facing range Fcb.

As illustrated in a field of "S101" of FIG. 10, if the movable linear module 2c deviates from the facing range Fcb ("NO" in Step S101), the movable linear module 2c starts to move toward the facing range Fcb as in the first example (Step S102). In this third example, if the movable linear module 2c moving toward the facing range Fcb passes through the reference position Lp and the movable linear module 2c enters a side closer to the facing range Fcb than the reference position Lp ("YES" in Step S301) as illustrated in a field of "S301" of FIG. 10, a movement of the slider 4 from the movement start position Ls on the fixed linear module 2b toward the facing range Fcb is started (Step S302). In this way, the slider 4 is moved to the facing range Fcb in parallel with the movement of the movable linear module 2c to the facing range Fcb.

Further, as illustrated in a field of "S302" of FIG. 10, the movable linear module 2c reaches and stops at the facing range Fcb while the slider 4 is moving on the fixed linear module 2b. Subsequently, if the slider 4 reaches the movement target position Ld on the movable linear module 2c as illustrated in a field of "S105" of FIG. 10 and the completion of the movement of the slider 4 from the position illustrated in the field of "S302" of FIG. 10 to the movement target position Ld is confirmed ("YES" in Step S105), the control of FIG. 9 is finished. In this way, a slider transfer operation (Steps S302, S105) of moving the slider 4 from the position on the fixed linear module 2b illustrated in the field of "S302" of FIG. 10 to the movement target position Ld on the movable linear module 2c is performed.

As just described, in the third example of the slider transfer control, the control device 11 starts to move the slider 4 from the movement start position Ls on the fixed linear module 2b where the slider 4 is stopped when the preparation operation is started toward the facing range Fcb when the slider 4 moving to the facing range Fcb passes through the reference position Lp in the preparation operation (Step S102) of moving the movable linear module 2c to the facing range Fcb. The slider transfer operation is performed (Steps S302, S105) by moving the slider 4 to the movable linear module 2c moved to the facing range Fcb. In such a configuration, the movement of the slider 4 toward the facing range Fcb is started in parallel with the movement of the movable linear module 2c to the facing range Fcb (Step S102), and an efficient control can be executed, utilizing a period required to move the movable linear module 2c to the facing range Fcb for the movement of the slider 4.

In the above examples, the slider transfer operation of moving the slider 4 from the fixed linear module 2b to the movable linear module 2c has been described. However, a slider transfer operation of moving the slider 4 from the movable linear module 2c, 2d to the fixed linear module 2a, 2b can also be controlled by the slider transfer control of FIG. 5 or 7. Next, this point is described.

Figure 11:
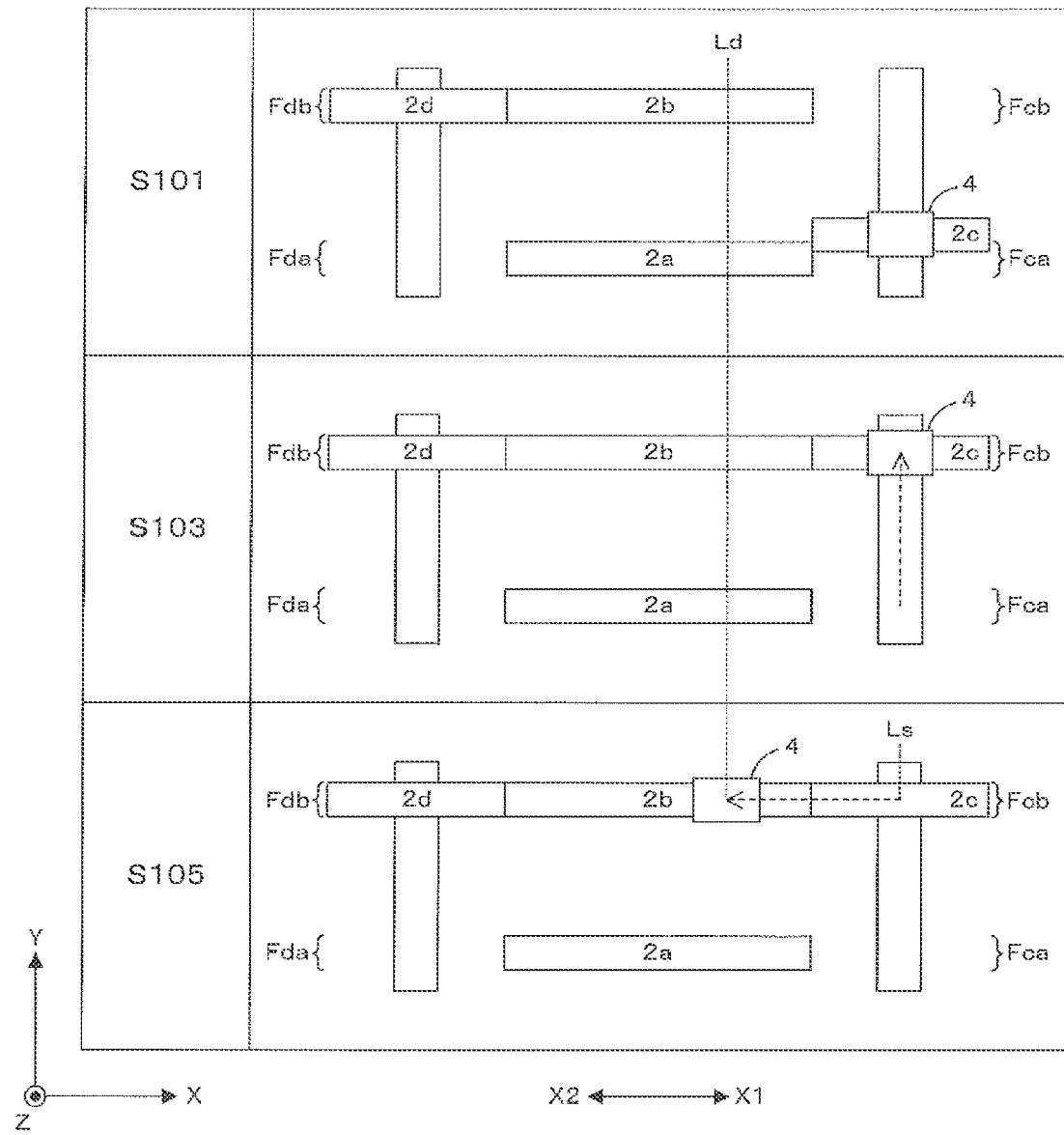
FIG. 11 is a chart schematically showing a modification of the operation performed by the slider transfer control of FIG. 5.

FIG. 11 is a chart schematically showing a modification of the operation performed by the slider transfer control of FIG. 5. Controls to be described using this modification can be commonly performed for slider transfer operations by the following combinations:

Fixed linear module 2a and movable linear module 2c,
Fixed linear module 2a and movable linear module 2d,
Fixed linear module 2b and movable linear module 2c, and
Fixed linear module 2b and movable linear module 2d.

The slider transfer operation of moving the slider 4 from the movable linear module 2c to the fixed linear module 2b is described as an example here. Note that it is assumed that the slider 4 and the movable linear modules 2c, 2d are stopped when this flow chart is started. These points are also common to operation examples by the slider transfer control described later.

In Step S101, it is judged whether or not the slider 4 can be transferred from the movable linear module 2c to the fixed linear module 2b. Specifically, if the movable linear module 2c as a movement origin of the slider 4 is located in the facing range Fcb facing toward the fixed linear module 2b as a movement destination of the slider 4, it is judged that the transfer can be performed ("YES" in Step S101). If the movable linear module 2c is not located in the facing range Fcb facing toward the fixed linear module 2b, it is judged that the transfer cannot be performed ("NO" in Step S101). Note that if even a part of the movable linear module 2c is located outside the facing range Fcb, it is judged that the movable linear module 2c is not located in the facing range Fcb.

If it is judged in Step S101 that the transfer can be performed (YES), advance is made to Step S104. On the other hand, if the movable linear module 2c is not located in the facing range Fcb and deviates from the facing range Fcb in the Y direction as illustrated in a field of "S101" of FIG. 11, it is judged in Step S101 that the transfer cannot be performed (NO). In this case, a movement of the movable linear module 2c to the facing range Fcb is started and the movable linear module 2c moves toward the facing range Fcb in the Y direction (Step S102). When the movable linear module 2c reaches the facing range Fcb as illustrated in a field of "S103" of FIG. 11 and the completion of the movement of the movable linear module 2c to the facing range Fcb is confirmed ("YES" in Step S103), advance is made to Step S4.

In Step S104, a movement of the slider 4 from the movement start position Ls on the movable linear module 2c in the facing range Fcb toward the movement target position Ld on the fixed linear module 2b is started, and the slider 4 moves from the movement start position Ls toward the movement target position Ld in the X direction. If the slider 4 reaches the movement target position Ld on the fixed linear module 2b as illustrated in a field of "S105" of FIG. 11 and the completion of the movement of the slider 4 from the movement start position Ls to the movement target position Ld is confirmed ("YES" in Step S105), the control of FIG. 5 is finished. In this way, the slider transfer operation (Steps S104, S105) of moving the slider 4 from the movement start position Ls on the movable linear module 2c to the movement target position Ld on the fixed linear module 2b is performed.

As just described, in the modification of the operation based on the slider transfer control of FIG. 5, the judgment process (Step S101) of judging whether or not the movable linear module 2c is located in the facing range Fcb is performed before the slider transfer operation (Steps S104, S105) of moving the slider 4 from the movable linear module 2c located in the facing range Fcb to the fixed linear module 2d is performed. As a result, unless the movable linear module 2c is judged to be located in the facing range Fcb, the slider transfer operation (Steps S104, S105) is performed after the preparation operation (Steps S102, S103) of moving the movable linear module 2c to the facing range Fcb is performed. Therefore, the slider 4 can be properly moved from the movable linear module 2c to the fixed linear module 2b.

Figure 12:
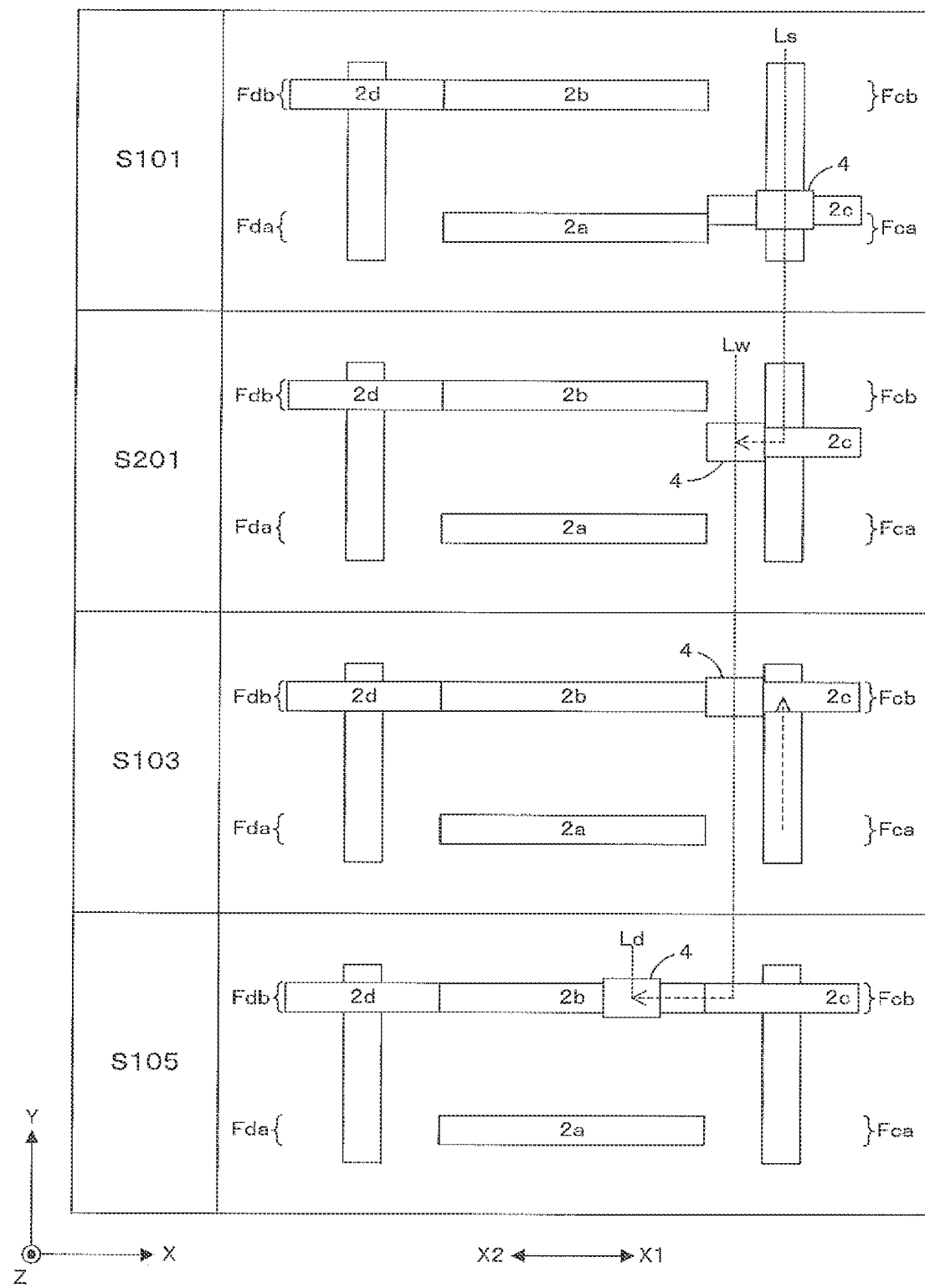
FIG. 12 is a chart schematically showing a modification of the operation performed by the slider transfer control of FIG. 7.

FIG. 12 is a chart schematically showing a modification of the operation performed by the slider transfer control of FIG. 7. Also in an example of FIG. 12, the slider transfer operation of moving the slider 4 from the movable linear module 2c to the fixed linear module 2b is shown. This description is centered on differences from the operation shown in FIG. 11, common parts are denoted by corresponding reference signs and description is omitted as appropriate. However, it goes without saying that similar effects are achieved by having the common parts.

In the example of FIG. 12, the standby position Lw is set on an end of the movable linear module 2c on the side of the fixed linear module 2b (X2 side). This standby position Lw is set on the movable linear module 2c to be located closer to the fixed linear module 2b than the movement start position Ls of the slider 4 on the movable linear module 2c in the X direction. That is, the standby position Lw is provided on the end of the movable linear module 2c to be adjacent to the fixed linear module 2b with the movable linear module 2c located in the facing range Fcb.

As illustrated in a field of "S101" of FIG. 12, the movable linear module 2c deviates from the facing range Fcb and the slider 4 moves toward the standby position Lw as the movable linear module 2c starts to move toward the facing range Fcb (Step S201). In this way, the movement of the slider 4 from the movement start position Ls to the standby position Lw is performed (Step S201) in parallel with the movement of the movable linear module 2c (Steps S102, S103).

As illustrated in a field of "S201" of FIG. 12, the slider 4 stops at the standby position Lw when reaching this standby position Lw. In this way, the slider 4 waits at the standby position Lw until the movable linear module 2c reaches the facing range Fcb. Then, as illustrated in a field of "S103" of FIG. 12, the slider 4 starts to move from the standby position Lw toward the movement target position Ld (Step S104) when the movement of the movable linear module 2c to the facing range Fcb is completed ("YES" in Step S103). Then, if the slider 4 reaches the movement target position Ld on the fixed linear module 2b as illustrated in a field of "S105" of FIG. 12 and the completion of the movement of the slider 4 from the standby position Lw to the movement target position Ld is confirmed ("YES" in Step S105), the control of FIG. 7 is finished. In this way, a slider transfer operation (Steps S104, S105) of moving the slider 4 from the standby position Lw on the movable linear module 2c to the movement target position Ld on the fixed linear module 2b is performed.

As just described, in the modification of the operation based on the slider transfer control of FIG. 7, the control device 11 performs the standby operation (Step S201) of moving the slider 4 from the movement start position Ls (stop position) where the slider 4 is stopped when the preparation operation (Steps S102, S103) of moving the movable linear module 2c into the facing range Fcb is started to the standby position Lw is performed in parallel with the preparation operation (Steps S102, S103), the standby position Lw being closer to the fixed linear module 2b (X2 side) in the X direction than the movement start position Ls. In such a configuration, the slider 4 is moved to the standby position Lw in parallel with the preparation operation (Steps S102, S103) of moving the movable linear module 2c to the facing range Fcb, and an efficient control can be executed, utilizing a period required to move the movable linear module 2c to the facing range Fcb for the movement of the slider 4.

Further, the control device 11 performs the slider transfer operation (Steps S104, S105) by moving the slider 4 located at the standby position Lw to the fixed linear module 2b when the preparation operation (Steps S102, S103) of moving the movable linear module 2c to the facing range Fcb is completed after the completion of the standby operation of moving the slider 4 to the standby position Lw (Step S201). As just described, the slider 4 can be properly moved from the movable linear module 2c to the fixed linear module 2b in this way. Particularly, the slider 4 is caused to wait at the standby position Lw by the movement of the slider 4 to the standby position Lw performed in parallel with the movement of the movable linear module 2c to the facing range Fcb. Thus, the slider transfer operation can be quickly completed only by moving the slider 4 from the standby position Lw to the fixed linear module 2b after the movement of the movable linear module 2c to the facing range Fcb is completed.

As just described, in this embodiment, the linear conveyor system 1 corresponds to an example of a "linear conveyor system" of the disclosure, the control device 11 corresponds to an example of a "controller" of the disclosure, the program 18 corresponds to an example of a "linear conveyor system control program" of the disclosure, the recording medium 19 corresponds to an example of a "recording medium" of the disclosure, the fixed linear modules 2a, 2b correspond to examples of a "fixed linear module" of the disclosure, the movable linear modules 2c, 2d correspond to examples of a "movable linear module" of the disclosure, the actuators 5c, 5d and the movable linear module 2c, 2d constitute an example of a "module driving mechanism" of the disclosure, the facing ranges Fca, Fcb, Fda and Fdb correspond to examples of a "facing range" of the disclosure, the movement start position Ls corresponds to an example of a "stop position" of the disclosure, the standby position Lw corresponds to an example of a "standby position" of the disclosure, the reference position Lp corresponds to an example of a "predetermined position" of the disclosure, the movable regions Rc, Rd correspond to examples of a "movable region" of the disclosure, the X direction corresponds to an example of a "first direction" of the disclosure, and the Y direction corresponds to an example of a "second direction" of the disclosure.

Note that the disclosure is not limited to the above embodiment and various changes other than the aforementioned ones can be made without departing from the gist of the disclosure. For example, an array direction of the fixed linear modules 2a, 2b is not limited to the Y direction (horizontal direction) and may be the Z direction (vertical direction). In this case, the actuators 5c, 5d elevate and lower the movable linear modules 2c, 2d in the Z direction.

Further, the linear conveyor system 1 may be configured to move the slider 4 along an L-shaped path composed of one fixed linear module 2a and one actuator 5d for driving the movable linear module 2d. Alternatively, the fixed linear module 2b may be moved in parallel to the X direction from the state of FIG. 3 and arranged on a side opposite to the fixed linear modules 2a with respect to the actuator 5c.

Further, the number of the fixed linear modules 2a, 2b is not limited to two and may be three or more.

Further, the driving directions of the slider 4 by the fixed linear modules 2a, 2b and the driving directions of the slider 4 by the actuators 5c, 5d are not necessarily orthogonal and may be inclined with respect to each other.

What is claimed is:

1. A linear conveyor system, comprising:
a fixed linear module extending in a first direction and configured to drive a slider in the first direction;
a module driving mechanism that includes a movable linear module movable along a movable region extending in a second direction intersecting the first direction, the movable region including a facing range facing toward the fixed linear module from the first direction and a range other than the facing range, the movable linear module being configured to drive the slider in the first direction, and the module driving mechanism being configured to drive the movable linear module in the second direction in the movable region; and
a controller configured to control driving of the slider and the movable linear module,
wherein:
the slider is engageable with and disengageable from the fixed linear module from an end in the first direction and the fixed linear module is configured to drive the slider engaged with the fixed linear module in the first direction,
the slider is engageable with and disengageable from the movable linear module from an end in the first direction and the movable linear module is configured to drive the slider engaged with the movable linear module in the first direction,
a slider transfer operation of moving the slider between the fixed linear module and the movable linear module located in the facing range is performed, and
the controller is configured to perform the slider transfer operation after performing a preparation operation of moving the movable linear module to the facing range if the movable linear module is judged not to be located in the facing range as a result of performing a judgment process of judging whether or not the movable linear module is located in the facing range before the slider transfer operation is performed, the judgment process being performed under a condition that the movable linear module is stopped.

2. The linear conveyor system according to claim 1, wherein the slider is moved from the fixed linear module to the movable linear module located in the facing range in the slider transfer operation.

3. The linear conveyor system according to claim 2, wherein the controller is configured to perform a standby operation of moving the slider from a stop position where the slider is stopped when the preparation operation is started to a standby position on the fixed linear module closer to the facing range than the stop position in the first direction in parallel with the preparation operation.

4. The linear conveyor system according to claim 3, wherein the controller is configured to perform the slider transfer operation by moving the slider located at the standby position on the fixed linear module to the movable linear module moved to the facing range by the preparation operation when the preparation operation is completed after the completion of the standby operation.

5. The linear conveyor system according to claim 2, wherein the controller is configured to perform the slider transfer operation by starting to move the slider from a stop position on the fixed linear module where the slider is stopped when the preparation operation is started toward the facing range when the slider moving toward the facing range in the preparation operation passes through a predetermined position and moving the slider to the movable linear module moved to the facing range by the preparation operation.

6. The linear conveyor system according to claim 1, wherein the slider is moved from the movable linear module located in the facing range to the fixed linear module in the slider transfer operation.

7. The linear conveyor system according to claim 6, wherein the controller is configured to perform a standby operation of moving the slider from a stop position where the slider is stopped when the preparation operation is started to a standby position on the movable linear module closer to the fixed module than the stop position in the first direction in parallel with the preparation operation.

8. The linear conveyor system according to claim 7, wherein the controller is configured to perform the slider transfer operation by moving the slider located at the standby position on the movable linear module moved to the facing range by the preparation operation to the fixed linear module when the preparation operation is completed after the completion of the standby operation.

9. A control method for a linear conveyor system including a fixed linear module extending in a first direction and configured to drive a slider in the first direction, and a module driving mechanism that includes a movable linear module movable along a movable region extending in a second direction intersecting the first direction, the movable region including a facing range facing toward the fixed linear module from the first direction and a range other than the facing range, the movable linear module being configured to drive the slider in the first direction, the module driving mechanism being configured to drive the movable linear module in the second direction in the movable region, comprising:
performing a judgment process of judging whether or not the movable linear module is located in the facing range before a slider transfer operation of moving the slider between the fixed linear module and the movable linear module located in the facing range is performed, the judgment process being performed under a condition that the movable linear module is stopped;

performing a preparation operation of moving the movable linear module into the facing range if the movable linear module is judged not to be located in the facing range in the judgment process; and performing the slider transfer operation after the preparation operation.

10. A computer readable medium storing a linear conveyor system control program for a linear conveyor system including a fixed linear module extending in a first direction and being configured to drive a slider in the first direction, and a module driving mechanism that includes a movable linear module movable along a movable region extending in a second direction intersecting the first direction, the movable region including a facing range facing toward the fixed linear module from the first direction and a range other than the facing range, the movable linear module being configured to drive the slider in the first direction, and the module driving mechanism being configured to drive the movable linear module in the second direction in the movable region, the linear conveyor system control program being configured to cause a computer to perform a judgment process of judging whether or not the movable linear module is located in the facing range before a slider transfer operation of moving the slider between the fixed linear module and the movable linear module located in the facing range is performed, the judgment process being performed under a condition that the movable linear module is stopped;

perform a preparation operation of moving the movable linear module into the facing range if the movable linear module is judged not to be located in the facing range in the judgment process; and perform the slider transfer operation after the preparation operation.

* * * * *